United States Patent [19]

Northcutt

[11] 4,353,947
[45] Oct. 12, 1982

[54] LAMINATED COMPOSITE STRUCTURE AND METHOD OF MANUFACTURE

[75] Inventor: Charles D. Northcutt, Midland, Tex.

[73] Assignee: International Harvester Co., Chicago, Ill.

[21] Appl. No.: 308,642

[22] Filed: Oct. 5, 1981

[51] Int. Cl.³ .......................... B32B 3/12; B32B 5/12
[52] U.S. Cl. .................................. 428/116; 156/290; 156/295; 428/119; 428/251; 428/268; 428/284; 428/285; 428/286; 428/288; 428/298
[58] Field of Search .............. 428/116, 118, 268, 251, 428/228, 285, 286, 288, 298; 156/197, 295, 290, 325

[56] References Cited
U.S. PATENT DOCUMENTS

| | | | |
|---|---|---|---|
| 2,952,579 | 9/1960 | Merriman | 428/131 |
| 3,137,604 | 6/1964 | Bosch | 428/116 |
| 3,622,430 | 11/1971 | Jurisch | 428/118 |

Primary Examiner—Paul J. Thibodeau
Attorney, Agent, or Firm—D. K. Sullivan; F. D. AuBuchon

[57] ABSTRACT

A laminated composite structure having a rigid honeycomb core and upper and lower fabric skin layers is provided with a reservoir layer of randomly oriented fibers, such as chopped glass or chopped mat, between the core and the top skin to retain the resin during lay-up so that the top skin may be laid on dry and become impregnated upon compression of the laminate. A reservoir layer may also be used between the core and the bottom skin to improve the bond therebetween.

11 Claims, 4 Drawing Figures

U.S. Patent  Oct. 12, 1982  4,353,947
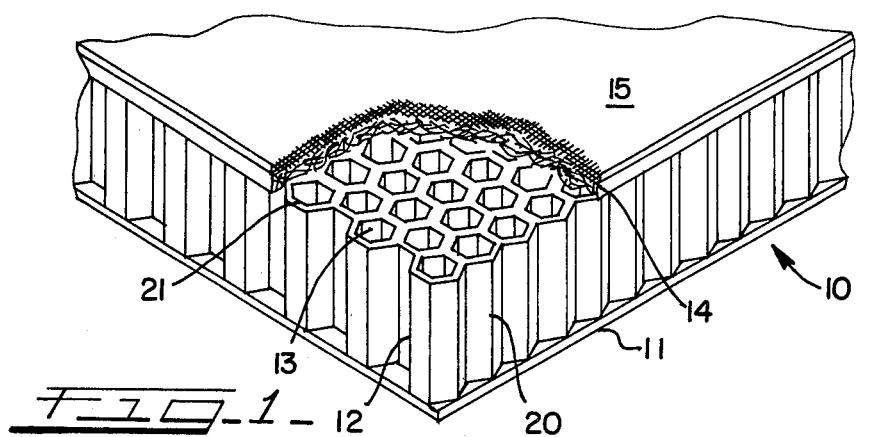
FIG-1-
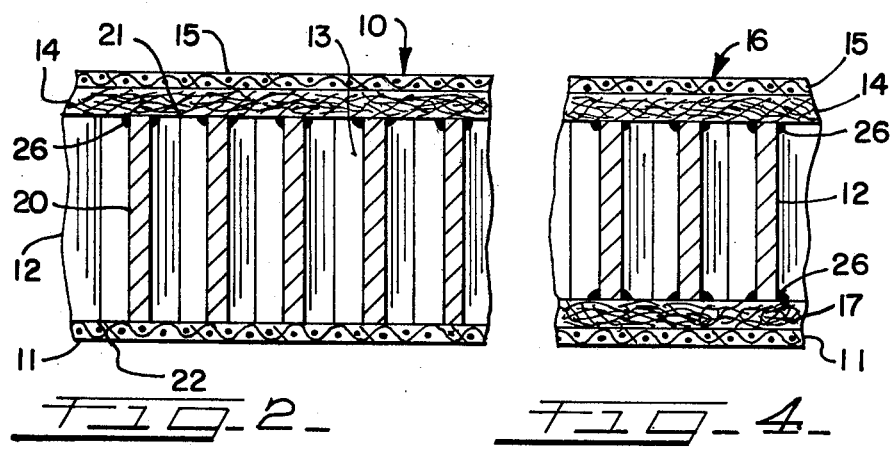
FIG-2-   FIG-4-
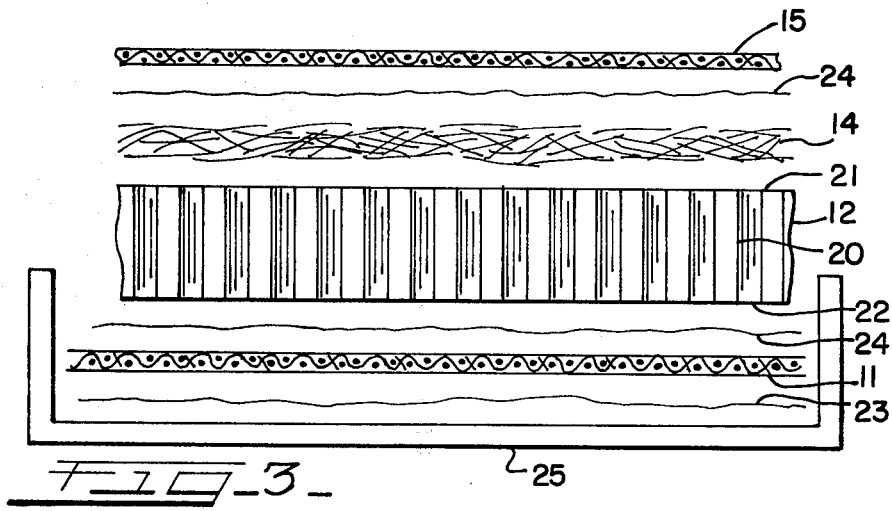
FIG-3-

LAMINATED COMPOSITE STRUCTURE AND METHOD OF MANUFACTURE

BACKGROUND OF THE INVENTION

This invention relates to fiber reinforced composite laminated structures of the type having a hollow cellular or honeycomb core sandwiched between resin impregnated layers of woven fabric made of high tensile strength fibers, such as fiberglass or graphite, and more particularly, to a composite honeycomb structure, and method of manufacture thereof, providing improved bonding of the core and skin layers without filling the cells of the core with excess resin while allowing the top fabric layer to be laid on dry over the core structure.

THE PRIOR ART

It is previously known to make lightweight laminated fiberglass reinforced composite structures having hollow honeycomb cores. To ensure a high strength structure, the skins must be made of woven fabric rather than randomly oriented fiber reinforcing. Examples of these may be found in Bosch U.S. Pat. No. 3,137,604 and Jurisich U.S. Pat. No. 3,622,430. In the prior art, at least the top fabric layer or skin is usually applied to the honeycomb core structure in the wet or resin impregnated state. However, in small scale operations, which are generally done manually, applying the skin layers in the wet state is undesirable because it raises safety problems due to the toxic and corrosive nature of some of the more commonly employed resins.

Different problems are encountered in applying the fabric layer dry. For example, if the fabric were laid on top of the core and the resin sprayed on top of the fabric, the weave of the fabric could be too wide to hold the resin, thus resulting in undesirable filling of the core cells with resin. Alternatively, the weave could be so small as to prevent the resin from fully penetrating to the lower side of the skin whereat the bonding to the core structure occurs. On the other hand, if the resin is applied to the core before the top fabric layer, the resin will run down and fill the cells of the core and probably not provide a good bond between the skin and the core.

SUMMARY OF THE INVENTION

Accordingly, it is a primary object of the invention described and claimed herein to provide a lightweight laminated cellular core composite structure wherein the upper fabric layer can be applied to the core structure in a dry state for subsequent impregnation by the resin.

Another object of the invention described herein is to provide a laminated cellular core composite structure having improved bonding between the skin and the core structure.

A more specific object of the invention is to provide a sponge-like resin retaining reservoir layer of reinforcing material between the top fabric layer and the core structure which retains the resin during the lay up of the various layers before curing, so that the top fabric layer can be applied dry, and which releases the resin to the fabric layer during compression of the laminate without material filling of the cells of the core.

Specifically, the above objects are met in a laminated composite structure and method of manufacture wherein the laminate comprises a bottom layer of fiberglass fabric impregnated with a thermosetting resin, a rigid honeycomb core structure having vertical cells opening to the top and bottom faces thereof disposed on the bottom layer, a sponge-like reservoir layer of chopped fiberglass or chopped fiberglass mat impregnated with resin and disposed on the upper side of the core, and a top layer of dry fiberglass fabric disposed on the reservoir layer. Upon compression of the laminate, the reservoir layer releases its excess resin to impregnate the top fabric layer. Since the compression of the reservoir layer also produces an excess of resin on its lower side, maximum capillary fillets are formed by the resin between the walls of the honeycomb and the reservoir layer which, upon curing, provide increased strength in the bond of the skin to the core compared to laying wet fabric on the core wherein excess resin is generally not available. For this reason, it is preferable to also provide a reservoir layer between the bottom fabric layer or skin and the lower side of the core structure.

DETAILED DESCRIPTION OF THE DRAWINGS

Other objects and advantages of the invention will become more apparent upon reading the following detailed description thereof and upon reference to the drawings in which:

FIG. 1 is a fragmented perspective view of the invention with the layers thereof in fragmented away form to reveal the interior;

FIG. 2 is an elevational section of a portion of the invention shown in FIG. 1;

FIG. 3 is an exploded view of the layers of the composite structure prior to lamination; and FIG. 4 is an alternative form of the invention similar to FIG. 2.

DETAILED DESCRIPTION OF THE PREFERRED EMBODIMENTS

Referring to the drawings, there is shown, in FIGS. 1, 2, and 3, a portion of a laminated composite structural panel 10 comprising a sheet-like bottom or skin layer 11, a relatively rigid cellular core structure 12, a sponge-like reservoir layer 14, and a sheet-like top or skin layer 15. FIG. 4 illustrates an alternate, but perhaps preferable for some reasons, embodiment 16 wherein a sponge-like reservoir layer 17 is also disposed between the bottom skin layer 11 and the core structure 12, the panel 16 being otherwise of the same construction as the panel 10. It will be understood that the terms "top" and "bottom", while having specific orientational significance during the process of manufacture of the panels 10 and 16 by the hand lay-up method, merely provide relative orientation when considering a completed panel structure.

Viewing the panel 10 in greater detail, the skin layers 11 and 15 both comprise resin impregnated high tensile strength woven fibers, such as fiberglass cloth or woven roving. These produce high strength panel structures, because of their bidirectional fiber orientation whereas randomly oriented fibers product considerably lower strength structures. Although liquid polyester resins are preferred, any thermosetting resin compatible with the fiber reinforcing material and the molding process may be used.

The cellular core 12 is preferably a rigid honeycomb structure formed from a plurality of vertical walls 20 disposed in continuous hexagonal adjacent relation to produce adjacent hexagonal cells 13 opening to both the upper surface 21 and the lower surface 22 of the core 12. The core 12 is preferably made of thin metal, but may also be made of resin soaked paper or cardboard or other suitable materials to produce a relatively rigid structure.

The reservoir layer 14 comprises chopped fiberglass fibers or chopped fiberglass mat or other sponge-like glass fiber structure having randomly oriented fibers which facilitate the absorption of a considerable amount of resin. The material characteristic is that the reservoir layer 14 must be capable of holding and releasing sufficient excess resin to completely wet the top woven fiber skin layer 15 upon compression of the layers of the laminate while being compatible with the resin since the reservoir layer ultimately forms an additional layer of reinforcing as part of the skin in the finished composite panel.

In the hand lay-up process of manufacture of the panel 10, a gel coat resin layer 23 is deposited as by spraying on the mold 25. The lower woven fabric skin layer 11 is laid dry on the gel coat 23 and sprayed with a catalyzed resin 24 in sufficient quantity to ensure complete wetting of the fabric. The cellular honeycomb core 12 is disposed on top of the lower skin layer 11 so that the lower end of the walls 20 are in contact therewith for bonding. The sponge-like reservoir layer 14 is disposed on top of the core structure 12 in one of two ways depending on its composition. If the reservoir layer 14 is chopped fiberglass mat, the mat is laid on dry and then sprayed with catalyzed resin 24 to impregnate it. If the reservoir layer is chopped glass strands, the strands and the resin are simultaneously sprayed on the core using a conventional chopped/spray gun. The size of the core cells 13 and the consistency of the chopped glass and resin are such that no significant filling of the cells will occur as the result of spraying the resin and glass strands together. The top woven fabric skin layer 15 is then laid dry on the reservoir layer 14.

The layers of the laminate are then compressed using a vaccum bag, pressure bag, autoclave, or mating mold half or other processing method and resin is allowed to cure to form the finished panel. The compression of the layers causes the reservoir layer 14 to release the excess resins contained therein. The excess resin wets the top fabric layer 15 to form a resin impregnated top skin which is bonded through the reservoir layer 14 to the core structure. The excess resin on the bottom side of the reservoir layer 14 tends to fill the corners between the vertical walls 20 of the core 12 and the bottom side of the reservoir layer 14 to form capillary fillets 26 thereat of the maximum size that the surface tension of the resin will permit. This improves the strength of the bond of the skin layer 15 to the core 12 by increasing the area of bonded surface of both the honeycomb walls 20 and also of the lower side of the reservoir layer 14. However, even in the compressed state, there should not be enough resin present to cause any material filling of the honeycomb cells with resin and thus the light weight of the structure is maintained. Of course, the cells could be filled with materials, such as foams, for other reasons, such as fire retardation. The bonding and curing of the core and skin layers into a single laminated composite panel results in an air tight seal of the ends of the honeycomb cells 13 by the skin layers 11 and 15 which may provide added rigidity and heat insulating properties in the panel.

In FIG. 4, there is shown an alternative embodiment 16 of the panel structure which may be preferred if additional strength is desired although it may prove more costly from a material standpoint. In this embodiment, a lower sponge-like reservoir layer 17, substantially the same as the upper reservoir layer 14, that is, randomly oriented chopped fiberglass strands or chopped fiberglass mat, is disposed on the top of the bottom skin layer 11 and the core 12 is disposed on top of the reservoir layer 17. The balance of the construction and processing is otherwise the same as for the panel 10. Although the use of this additional layer does not provide the advantage of wetting a dry fabric layer above it, as the reservoir layer 14 does, it too provides excess resin upon compression and thus provides the maximum capillary fillets 26, which may be more like menisci in this orientation, and thus improves the bond of the lower skin 11 to the core 12, the reservoir layer 17 becoming part of the lower skin 11.

Thus, there has been provided in accordance with the invention a laminated composite structure and method of manufacture thereof which fully meets the objects, aims and advantages set forth above. In view of the foregoing description, those of skill in the art will recognize various modifications, alternatives which can be made to the above process without departing from the true scope of the invention. For example, it may be possible to use different high strength reinforcing fibers other than fiberglass in either the skin or reservoir layers. Accordingly, it is desired to cover all such modifications and alternatives as may fall within the scope of the appended claims.

What is claimed is:

1. A laminated composite structure comprising:
   a bottom layer of high tensile strength woven fibers impregnated with a thermosetting resin;
   a rigid cellular core having a plurality of interconnected walls defining cells open at the top face and at the bottom face of said core, said cells being substantially devoid of said resin, said bottom face of said core structure being operatively adhered to said bottom skin layer;
   a reservoir layer comprising randomly oriented high tensile strength fiber reinforcing material impregnated with said resin disposed on and adhered to said top face of said core structure, said reservoir layer being sponge-like in the uncured, uncompressed state such that resin is absorbed and held for subsequent release during compression;
   a top layer of high tensile strength woven fibers disposed above said reservoir layer, said reservoir layer releasing resin to impregnate said top fabric layer upon compression of said layers; and
   all of said layers and core being compressed and cured into a laminated composite structure.

2. The invention in accordance with claim 1 and said high tensile strength fibers comprising fiberglass.

3. The invention in accordance with claim 2 and a second sponge-like layer of said random oriented fiber reinforcing material disposed between said bottom layer and said core structure.

4. The invention in accordance with claim 2 or claim 3 and said core structure comprising a honeycomb having said walls perpendicular to said top and bottom faces, said cells being open at both ends to said top and bottom faces.

5. The invention in accordance with claim 2 or claim 3 and said reservoir layer material comprising chopped glass fibers.

6. The invention in accordance with claim 5 and said reservoir layer comprising a chopped fiberglass mat.

7. A laminated composite structure comprising a bottom woven fiberglass fabric skin layer, a second layer of randomly oriented fiberglass reinforcing material disposed on top of said bottom layer, a rigid cellular honeycomb core having a plurality of interconnected walls defining cells open at the top and faces thereof disposed on top of said randomly oriented second layer; a third layer of randomly oriented fiberglass material disposed on top of said core and a fourth layer of woven fiberglass fabric disposed on top of said randomly oriented third layer, all of said fiberglass layers being impregnated with a thermosetting resin, the intersection between said core walls and said randomly oriented fiberglass layers being provided with capillary fillets of the maximum size permitted by the surface tension of the resin.

8. A method of manufacturing a cellular core fiber reinforced composite structure comprising:
 laying a bottom skin layer of woven high tensile fibers on a mold;
 impregnating said bottom skin layer with a thermosetting plastic resin;
 disposing a cellular core structure having cells opening to the top and bottom faces thereon on top of said bottom skin layer;
 disposing a sponge-like reservoir layer of resin impregnated randomly oriented fibers on top of said core structure;
 laying a dry top layer of woven high strength fibers on top of said reservoir layer;
 effecting sufficient compression of said layers, without collapsing said core structure, such that said top woven fabric layer is impregnated by resin released from said sponge-like layer without substantial filling of said cells with resin; and
 curing said resin to effect bonding of said core structure and adjacent layers.

9. The invention in accordance with claim 8 and said step of disposing said impregnated sponge-like reservoir layer comprising disposing a non-woven fiber mat on said core structure and applying said resin to said mat.

10. The invention in accordance with claim 8 or claim 9 wherein said fibers comprise chopped fiberglass fibers.

11. The invention in accordance with claim 10 wherein a second sponge-like reservoir layer of fibers impregnated with said resin is disposed between said core structure and said bottom layer.

* * * * *